United States Patent [19]

Manuel

[11] 3,781,057
[45] Dec. 25, 1973

[54] CAMPER TIE DOWN ARRANGEMENT

[76] Inventor: Larry N. Manuel, 16611 Grand Ave., Bellflower, Calif. 90706

[22] Filed: Oct. 28, 1971

[21] Appl. No.: 193,532

[52] U.S. Cl. .......................... 296/23 MC, 248/361
[51] Int. Cl. ............................................ B60p 3/32
[58] Field of Search ............... 296/23 MC; 248/361

[56] References Cited
UNITED STATES PATENTS

| 3,356,408 | 12/1967 | Stutz | 296/23 MC |
| 3,368,785 | 2/1968 | Weiler | 296/23 MC |
| 3,454,253 | 7/1969 | Lippiatt | 296/23 MC |
| 3,486,785 | 12/1969 | Corson | 296/23 MC |
| 3,549,194 | 12/1970 | Watson | 296/23 MC |
| 3,455,573 | 7/1969 | Magers | 296/23 MC |

*Primary Examiner*—Philip Goodman
*Attorney*—Andrew M. Lesniak

[57] ABSTRACT

Camper tie downs for securing a camper to the side panels of a pickup truck. Different embodiments of camper tie downs each include a frontwardly projecting nose at the lowermost end of a main arm that angles toward one lateral side of the main arm. Two camper tie downs affixed to each truck side panel are used to anchor the camper against frontward and rearward shifting, tilting, and lifting relative to the bed of the pickup truck. A respective chain attached to the camper is anchored to each tie down by using a head bolt having a tilted head portion that mounts within an anchor hole in the camper tie down nose and is held therein by a threaded nut that engages the underside of the tie down nose.

13 Claims, 5 Drawing Figures

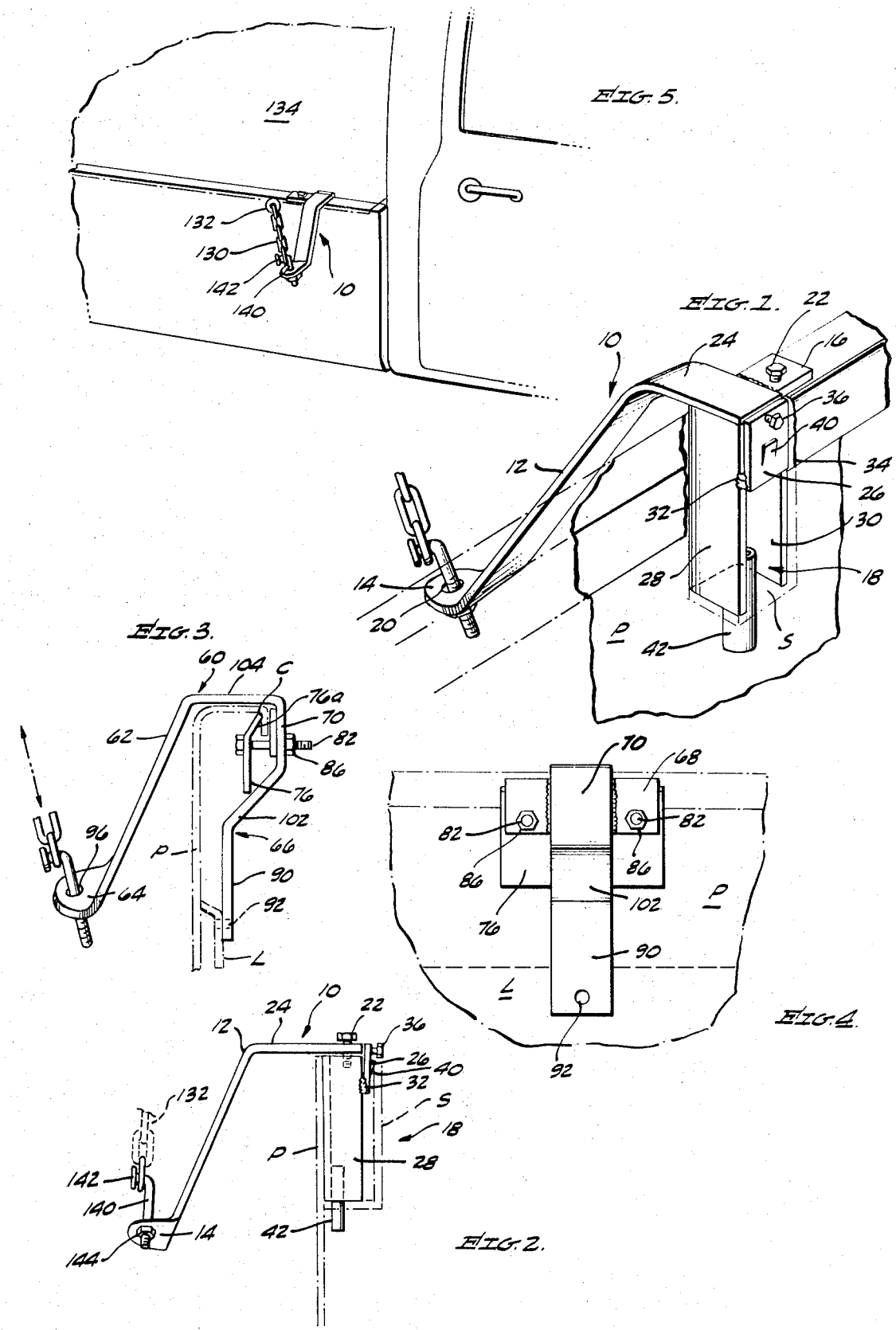

CAMPER TIE DOWN ARRANGEMENT

The present invention relates to camper tie downs that may be used to secure a camper on the bed of a pickup truck to the side panels of the pickup truck. The present invention also relates to a particular arrangement wherein chains attached to the camper are anchored to the camper tie downs on the truck side panels by the use of specifically shaped head bolts.

Camper tie downs are presently in widespread usage. An illustrated discussion of the purpose and utility of camper tie donws is set forth in the U.S. Pat. No. 3,540,772. Heretofore, certain camper tie downs have, in general, been affixed to pickup truck side panels by clamping the tie downs to the side panels or by securely anchoring the tie downs to side panel stakeholes. These different kinds of camper tie downs both include a main arm that projects outwardly away from the truck side panels at an outward and downward angle. The main arm has an anchor hole in its lowermost part which is used to receive an eyebolt attached to a chain connecting or tieing part of the camper to the tie down. The eyebolt is anchored in the anchor hole by use of a threaded nut threaded onto the eyebolt so that the chained eyebolt cannot be removed from the anchor hole without first removing the nut from the eyebolt.

The nut is threaded onto the eyebolt against the underside of the main arm to reduce the slack existing in the chain portion between the tie down and the camper. This arrangement eliminates the necessity for using a relatively expensive turnbuckle that is used in some tie down arrangements to take up chain slack in the chain portion from the camper to the tie down. In those tie down arrangements where a turnbuckle is attached to the chain between the tie down and the camper, it is possible to attach one end of the chain to the tie down by using a U shaped fastener bolt and nuts threaded onto each end of the fastener bolt to anchor it in an anchor slot formed in the main arm of the tie down. The turnbuckle may then be adjusted by rotating it to take up slack in the chain connecting the camper to the tie down.

When a turnbuckle is used in chaining a tie down to a camper it desirably requires considerable pull by the camper on the tie down before the turnbuckle threads will start to strip. The loop or eye of an eyebolt, however, will begin to open when pull exerted thereon is great but not as great as the amount of pull required to cause the threads of a turnbuckle to begin to stip. Therefore, it has been more desirable heretofore to use a turnbuckle in chaining a tie down to a camper rather than the simple eyebolt using arrangement mentioned hereinabove even though the turnbuckle is expensive.

As will be explained hereinafter, a new arrangement, in accordance with the teachings of the present invention, is disclosed herein that does not involve the use of a turnbuckle or an eyebolt for anchoring a chain to the main arm of a tie down so that the chain will be taut. This new arrangement is less expensive than the eyebolt utilizing arrangement described hereinabove but nevertheless can withstand pulls on the tie down greater in magnitude than the magnitude of the pulls that the eye or loop of an eyebolt can withstand without being worked open and can even withstand magnitudes of pull of about twice as great as the magnitudes of pull that the threads of a typical aluminum turnbuckle can withstand without starting to strip.

Some of the earlier tie downs include an outwardly projecting nose portion at the lowermost part of the main arm and other earlier tie downs do not. In either case it is common to use the tie down to anchor a chain that is secured to a part of the camper that is not directly vertically above the lowermost part of the main arm. In these instances, the chain that is attached to the nose or the lowermost part of the main arm of the tie down, by an eyebolt anchored in the anchor hole of the main arm, forms an angle with a vertical line taken through the anchor hole of the anchor hole of the main arm. Typically, the chain may form a twenty five to thirty five degree angle with this vertical line as measured while viewing the camper and truck from the side of the truck side panel.

Usually there are two camper tie downs spaced along the length of each truck side panel and the chains secured to the tie downs are secured to different parts of the camper that are respectively located rearwardly of the tie downs that are frontmost on the side panels and located frontwardly of the tie downs that are rearmost on the side panels. In this arrangement the tie downs cooperate to secure the camper against frontward or rearward shifting, tilting and lifting that might occur when the moving truck carrying the camper hits a bump in the road or undergoes a severe jolt.

In the well known arrangement of four tie downs on two truck side panels just described, the elimination of the slack in the tie down chains by adjusting the position of the nuts on the eyebolts held in the anchor holes of the respective main arms of the tie downs brings the nuts up tight against the underside of the noses or lowermost ends of the main arms and this results in misalignment of the eyebolts with the attached chains. It thus happens that the length of the different eyebolts may form an angle of about fifteen to twenty five degrees with the attached chains. As a result, any pulling on the eyebolt loops by the attached chains can work the eyebolt loops open easier than it could otherwise if little or no angle were formed between the eyebolt and the attached chain. Consequently, the eyebolts may eventually have to be replaced due to opening of the loops of the eyebolts and, also, there is increased possibility that the camper may pull the chains loose of the eyebolt when the truck carrying the camper comes to a sudden stop or the like.

In order to circumvent the drawbacks of the particular tie down arrangement just discussed immediately hereinabove, a new arrangement is provided by the applicant. In this new arrangement, the two camper tie downs on each truck side panel each include an outwardly or frontwardly projecting nose at the lowermost end of the main arm that is angled toward one lateral side of the main arm. In this new arrangement, an anchor hole in the nose receives a head bolt having a portion forming a head that is tilted with respect to the threaded portion of the head bolt. The head bolt is used in lieu of an eyebolt to anchor a length of tie down chain to the nose of each tie down. This novel arrangement, in accordance with the teachings of the present invention, allows the threaded part of the head bolt to be substantially directly aligned with the associated chain when a nut on the threaded part of the head bolt is adjusted to tighten it against the underside of the nose to firmly anchor the chain to the tie down and to eliminate any slack in the chain from the tie down to the camper. The length of the head bolt is thus aligned in the line of direction of the chain extending from the head bolt so that any pull on the head bolt occurs in a direct line of direction from the camper part where the chain is anchored to the nose of the tie down.

Two different embodiments of camper tie downs with specially angled noses are described herein. One of these camper tie down embodiments can be securely anchored to a stakehole of a truck side panel. The other of these camper tie down embodiments can be securely clamped to a truck side panel. Both of these embodiments possess different structural features that provide excellent stability of securement of the tie down embodiment to the truck side panel. These features form an important part of the present invention and will be described in detail.

Accordingly, it is an object of the present invention to provide different embodiments of camper tie downs that can be secured to the side panels of a pickup truck and used to chain or otherwise tie a camper on the truck to the truck side panels.

It is also an object of the present invention to provide certain camper tie downs wherein the main arm thereof includes a nose portion at the lowermost part of the main arm which projects outwardly or frontwardly from the main arm and angles toward one lateral side of the main arm. A related object of the present invention is to provide an arrangement therein such tie downs are used together with head bolts having tilted heads to anchor tie down chains.

It is yet another object of the present invention to provide camper tie downs having improved structural features that are used to accomplish excellent securement of the tie downs to pickup truck side panels.

The foregoing objects, advantages, and features of the present invention along with related objects, advantages, and features of the present invention will become apparent upon a review of the following detailed description of the invention taken together with the accompanying drawings wherein:

FIGS. 1 and 2 are views of a tie down, being a first embodiment of the present invention, mounted on a truck side panel.

FIGS. 3 and 4 are views of a tie down, being a second embodiment of the present invention, mounted on a truck side panel.

FIG. 5 is a view showing the utilization of a tie down to anchor a chain secured to a camper supported on a pickup truck.

Referring to both FIGS. 1 and 2, the views given therein depict a camper tie down 10 that is anchored to a truck side panel P by means of an extension of the tie down that is located in a rectangular stakehole of the side panel. In order that the features of the tie down 10 can be clearly seen in FIGS. 1 and 2 the side panel is partially cut away in FIG. 1 and is shown in phantom, by the use of dashed lines, in FIG. 2. The camper tie down 10 includes a front main arm 12 that projects frontwardly away from the front or outside wall of the side panel. The main arm has a nose 14 at its lowermost part that projects frontwardly away from the side panel and is tilted at an angle so that the nose 14 angles toward one lateral side of the main arm 12. The tie down 10 includes a horizontal side arm 16 that projects from one of the lateral sides, the side the nose 14 angles toward (see FIG. 2), of the topmost part of the main arm 12 and rests upon a portion of the top lip of the side panel P that is laterally adjacent the stakehole. An extension 18 that is a three sided member channel member is welded to the underside of the topmost part of the main arm 12. The nose 14 has a circular through hole 20, used as an anchor hole, formed therein. The side arm 10 has a circular through hole (not labeled) that receives a bolt 22 that passes through a hole in the top lip of the side panel. A nut on the bolt 22 beneath the top lip secures the side arm 18 to the top lip. The topmost part of the main arm is designated by the number 24.

A plate 26 is affixed to the rear side of the extension 18, near the uppermost portion thereof, by welding the plate to the opposed channel walls 28, 30 at weld points 32, 34 located on the lowermost part of the rear edges of the channel walls. A threaded circular through hole (not labeled), located in the plate 26 directly opposite the rear of the top part 24 of the main arm 12, receives a circumferentially threaded screw member 36 that abuts the rear of the main arm top part 24 through the hole of the plate 26. A rectangular three sided stub 40 located generally vertically beneath the hole of the plate is spaced a predetermined distance therefrom so that the top free edge of the stub projects a slight distance to the rear of the plate 26. The stub 40 is an integral part of the plate 26 that has been pressed outward of the body of the plate 26. A tube cylinder 42 is welded to the lowermost part of the base wall of the channel member extension 18.

Referring to FIGS. 3 and 4, the views given therein show a camper tie down 60 that is clamped to a side panel P (shown in Phantom) of a pickup truck. The tie down 60 includes a main arm 62 with a frontwardly projecting nose 64 which is tilted or angled as shown in FIG. 3 toward one lateral side of the main arm. An extension 66 at the rear side of the tie down 60 is formed from the same piece of metal stock that forms the main arm 62. A clamp plate 68 is welded to the topmost part 70 of the extension 66 near an inside corner that is formed by the juncture of the main arm 62 and the extension 66. The clamp plate 68 is a rectangular, flat piece of metal that has two laterally spaced circular through holes (not labeled), used as camp holes, that are located on opposite lateral sides of part 70 of the extension 66. A clamp bracket 76 with two laterally spaced square through holes (not labeled) is maintained in clamping relation with the clamp plate 68 by two laterally spaced carriage bolts 82 passing through aligned holes of the clamp plate 68 and the clamp bracket 76. Each bolt 82 has a square shank portion, between its threads and its head, that passes through a respective square hole of the clamp bracket 76 so that each bolt 82 cannot turn relative to the clamp bracket 76 when a nut is threaded onto the bolt. A threaded nut 86, at the rear side of the clamp plate 68, on each bolt 82 is threaded tight against the clamp plate 68 to clamp the rear inside lip of the panel side between the clamp plate 68 and the clamp bracket 76. Lowermost part 90 of the extension 66 has a circular hole 92 therein that may be used to secure this part to a liner L (shown in phantom) connected to the inside of the side panel by means of a nut and bolt arrangement wherein a bolt would pass through the hole 92 and a hole in the liner L and a nut would hold the lowermost part 90 flat against the inside of the liner L. The nose 64 of the main arm 62 includes a circular through (anchor) hole 96 to be used to anchor one end of a chain to the nose 64. The clamp bracket 76 includes a topmost wing portion 76a that angles away from the plane of the main part of the clamp bracket 76 into engagement with the inside corner of the top and rearlips of the side panel.

The extension 66 includes an intermediate part 102, connecting the parts 70 and 90, which is at an incline. The inclination of the part 102 allows the lowermost part 90 to be positioned against the inside wall of the truck side panel, the topmost part 70 to be positioned against the inside rear lip of the side panel, and a topmost horizontal part 104 of the main arm 62 to be positioned upon the top lip of the side panel P. In this arrangement, the lowermost edge of the clamp bracket 76 rides up along the front surface of the extension part 102 as the nuts 86 on the clamp bolts 82 are tightened against the extension part 70. As a result, the upper and lower edges of the clamp bracket 76 become wedged between the inclined extension part 102 and the inside rear corner of the top and rear lips of the truck side panel.

Referring again to FIG. 1, the camper tie down 10 is shown therein in relation to a portion of a pickup truck side panel P with the extension 18 anchored in a rectangular side panel stakehole formed in the top lip of the side panel. A stakehole member S, shown by phantom lines, is attached to the panel P. MemberS is a channel member with three vertical walls and an apertured horizontal base wall at the bottom thereof. The panel P together with the walls of the member S form a compartment that receive the extension 18. The tube cylinder 42 may be seated in a round hole (not shown) formed in the base wall or portion of the stakehole member S and situated directly below the stakehole. The upper part of the plate 26 is thread cammed away from the rear side of the top part of the arm 12 by the screw member 36 located in the hole of the plate 26, the position of the screw member 36 having been adjusted after the insertion of the extension into the stakehole, to push the upper part of the plate 26 away from the main arm 12 to thus wedge the plate 26 and the extension 18 into the stakehole. The wedging of these members in the stakehole serves to situate the top free edge of the stub 40 beneath the rear side of the stakehole so that the extension cannot be withdrawn from the stakehole without first adjusting the position of the screw member 36 in the hole of the plate 26 to allow the resilience of the joints 32, 34 to return the upper part of the plate 26 toward the rear side of the main arm 12 so as to clear the nearby side of the stakehole when it is desired to detach the tie down from the side panel. The side arm 16 rests upon the top lip of the side panel P and the threaded bolt 22 passes through a hole in the top lip and is secured in place by a nut (not shown) threaded onto the bolt 22 against the underside of the panel top lip.

Referring again to FIGS. 3 and 4 the camper tie down 60 is shown therein in clamped relation to a portion of a truck side panel P. The inside rear lip of the side panel is clamped between the clamp bracket 76 and the parts 70 and 102 of the tie down 60 with the wing portion 76a of the bracket 76 angling into the inside corner of the rear and top lips of the side panel and with the lowermost part 100 of the bracket 76 contacting the front side of the part 102 of the tie down. Due to the incline of the part 102, the tightening of the nuts 86 onto the bolts 82 against the rear side of the tie down part 70 acts to cause the lower edge of the bracket 76 to ride up the incline of the part 102 as the nuts are tightened against the part 70 to actually force the upper edge of the clamp bracket 76 up into the inside corner of the rear and top lips of the side panel. The two bolts 82 act together so that the main arm 62 cannot be twisted or made to turn relative to the associated side panel. The camper tie down part 90 contacts the liner L and may be secured thereto by emans of a bolt passed through the hole 92 and through a hole in the liner L and fastened to the liner L and part 90 by a nut threaded onto the bolt.

In FIG. 5, the view given shows the manner in which a chain can be fastened to either embodiment of the camper tie downs of the present inveniton to secure a camper to either side panel P of a pickup truck. In order to simplify the discussion it will be assumed that the camper tie down 10 is depicted in FIG. 5. However, it is to be understood that the following remarks are also applicable to the instance wherein the camper 60 is employed in lieu of the camper tie down 10.

A length of link chain 130 is anchored by an adaptor link to an eyebolt 132, or the like, that is mounted on the underside of a laterally projecting part of the camper 134 (shown by phantom lines) supported on the bed of a pickup truck 136. A head bolt 140 with a tilted head 142 is shown as arranged after it has been inserted into an end link of the chain 130, placed into the hole 20 of the nose 14, and fastened therein by a washer and a nut 144 threaded tight against the underside of the nose 14 to take up the chain slack and make the chain taut from the eyebolt 132 to the head bolt 140.

The nose 14 is angled toward the side of the arm 12 that is rearmost on the truck side panel. The eyebolt 132 is situated on the camper 134 at a point located generally toward the rear of the truck in relation to the position of the camper tie down 10. The angle of the nose 18 is such that the bolt head's longitudinal axis is aligned with the direction of the length of the chain 130. In other words, the head bolt points directly at the eyebolt 132.

One other tie down 10 (not shown) on the same side panel as that shown in FIG. 5 is arranged rearwardly of the tie down 10. This other tie down has its nose angled toward the front of the truck and a head bolt, chain, and eyebolt are employed, in a fashion similar to that shown, to chain the other tie down to the camper, the sole difference being that the chain angles from the nose of the other tie down both upwardly and forwardly to a point on the camper where the associated eyebolt is mounted. The tie down arrangement on the other truck side panel is symmetrically identical and involves two other tie downs each chained to the camper in a similar fashion. Accordingly, the camper is constrained against frontward or backward shifting or tilting movements relative to the truck. The total arrangement is different from the similar prior art arrangement mentioned earlier herein in that the head bolts and tie downs with angled noses are employed to achieve improved results as earlier explained.

It will be noted that in FIGS. 2 and 3 of the drawings the noses of the different depicted tie downs are angled toward opposite lateral sides of the respective tie downs so that one such tie down can be affixed to a truck side panel near the rear thereof and the other such tie down can be affixed to the same truck side panel near the front thereof. In each tie down the direction of angle of the nose is determined by whether the particular tie down is to be affixed toward the front or toward the rear of a given side panel.

The foregoing detailed description of camper tie downs, and camper tie down arrangement, is illustrative, and not exhaustive, and the extent of legal protection to be afforded to the invention described herein is to be determined by the scope of the following claims which are to be construed and understood in light of the foregoing illustrative description.

I claim:
1. A tie down comprising:
   a rear vertical extension member, a front main arm member including a first horizontal portion connected to an uppermost portion of the vertical extension member and including a second inclined portion extending from the first horizontal portion frontwardly and downwardly away from the vertical extension member so that the distance between the vertical extension member and the second inclined portion increases in the downward direction of the second inclined portion, a lowermost portion of the second inclined portion being formed into a frontwardly projecting nose that is angled toward one lateral side of the main arm member, the nose including an anchor hole therethrough.

2. The tie down set forth in claim 1 wherein a horizontal side arm having a through hole therein extends laterally from one lateral side of the first horizontal portion of the front main arm.

3. The tie down set forth in claim 1 wherein the rear vertical extension and the front main arm are integral portions of a single piece of metal.

4. The tie down set forth in claim 1 wherein the vertical extension member includes vertical upper and lower portions that are connected by an intermediate inclined portion so that the lower portion is located frontwardly of the upper portion.

5. The tie down set forth in claim 4 including a clamp plate connected to the upper portion of the vertical extension member, the clamp plate extending laterally beyond the lateral side of the upper portion of the vertical extension member and including two laterally spaced clamp holes located on opposite lateral sides of the upper portion of the vertical extension member, a clamp bracket including an uppermost wing portion that inclines toward an inside corner formed by the juncture of the first horizontal portion of the front main arm and the upper portion of the vertical extension member, the clamp bracket including two laterally spaced clamp holes located on opposite lateral sides of a lowermost clamp bracket portion, two nut and bolt arrangements including respective bolts passing through aligned holes of the clamp plate and the clamp bracket and respective nuts threaded onto the respective bolts to secure the clamp bracket to the clamp plate and to position the clamp bracket relative to the clamp plate so that a top edge of the clamp bracket wing portion angles toward the inside corner formed by the juncture of the first horizontal portion of the front main arm and the upper portion of the vertical extension member and so that the bottom edge of the clamp bracket contacts the frontside of the intermediate inclined portion of the vertical extension member.

6. The tie down set forth in claim 1 in combination with a head bolt having a portion forming a tilted head, a chain or the like anchored at one point to a member to be anchored to the tie down and attached at another point to the head bolt near the tilted head thereof, and a threaded nut threaded onto the threads of the head bolt, the combination being arranged with the head bolt being inserted into the anchor hole of the nose so that the head of the head bolt extends from the top side of the nose and so that the nut on the head bolt is tightened against the underside of the nose to eliminate slack in the chain or the like extending from the head bolt to the member to be anchored to the tie down.

7. In a combination wherein a camper is supported on the bed of a pickup truck or the like having two opposite side panels, an arrangement for tying the camper to the side panels of the pickup truck or the like, the arrangement comprising:
   two separate camper tie downs secured to a side panel at two laterally spaced points on the side panel;
   each tie down including a rear vertical extension member connected to a front main arm member, means for securing the vertical extension members to the side panel, the front main arm member of each tie down including a first horizontal portion connected to an uppermost portion of the vertical extension member and including a second inclined portion extending from the first horizontal portion frontwardly and downwardly away from the outermost front side of the side panel so that the distance between the vertical extension member and the second inclined portion increases in the downward direction of the second inclined portion, a lowermost portion of the second inclined portion of each tie down being formed into a frontwardly projecting nose that projects away from the side panel, the nose of each tie down including an anchor hole there through, and being angled toward a respective lateral side of the associated main arm member;
   a first one of said tie downs being located frontmost on the side panel and a second one of said tie downs being located rearmost on the side panel, the nose of the first one of said tie downs being angled toward the back end of the side panel and the nose of the second one of said tie downs being angled toward the front end of the side panel, a respective head bolt having a tilted head being inserted into the anchor hole of each tie down, a threaded nut threaded onto each head bolt against the underside of the associated nose to eliminate any slack in a chain or the like that is attached to the head bolt near the head thereof and also attached to a portion of the camper so that the head bolt is in direct alignment with the chain or the like that extends from the head bolt to the portion of the camper.

8. The combination comprising:
   a tie down including a main arm having a circular hole in the free end thereof, a length of chain, a head bolt with a portion at one end thereof that includes a bolt head that is tilted relative to the length of the head bolt, the head bolt being inserted into a link of the chain, the chain being anchored to the head bolt and the head bolt being inserted into the hole of the main arm of the tie down and being held captive therein by means of a nut member that is adjustably threaded onto the length of the head bolt.

9. A tie down comprising, in combination, a rear vertical extension member, a front main arm member including a first horizontal poriton connected to an uppermost portion of the extension member and including a second inclined portion extending from the first portion frontwardly and downwardly away from the extension member, a lowermost portion of the second inclined portion being formed into a frontwardly projecting nose having an anchor hole therethrough, a horizontal side arm having a through hole therein connected to and extending laterally from one lateral side of the first horizontal portion of the main arm member, the through anchor hole of the main arm member being adapted for use in anchoring a chain or the like to the main arm member, the through hole of the side arm being adapted for use in securing the tie down to a truck side panel or other like element.

10. A tie down in combination with a head bolt and a chain or the like, the tie down having a rear vertical extension member, a front main arm member including a first horizontal portion connected to an uppermost portion of the extension member and including a second inclined portion extending from the first horizontal portion frontwardly and downwardly away from the extension member, a lowermost portion of the second inclined portion being formed into a frontwardly projecting nose that is angled toward one lateral side of the main arm member, the nose including an anchor hole therethrough; the head bolt having a portion forming a head and having a portion forming a threaded shank, the chain or the like being adapted to be anchored at one point to a member to be anchored to the tie down, the chain or the like being attached at another point to the head bolt near the head thereof; the head bolt being inserted into the anchor hole of the nose so that the head of the head bolt extends from the top side of the nose, the shank having a nut threaded thereonto at the underside of the nose so that the nut may be tightened against the underside of the nose to eliminate slack in the chain or the like whenever the tie down is used together with the head bolt and chain or the like to anchor a member to the tie down by means of the chain or the like.

11. The combination of claim 10 wherein the head of the head bolt is tilted.

12. A tie down comprising:
a rear vertical extension member, a front main arm member including a frist horizontal portion connected to an uppermost portion of the vertical extension member and including a second inclined portion extending from the first horizontal portion frontwardly and downwardly away from the vertical extension member so that the distance between the vertical extension member and the second inclined portion increases in the downward direction of the second inclined portion, a lowermost portion of the second inclined portion being formed into a frontwardly projecting nose that is angled toward one lateral side of the main arm member, the nose including an anchor hole therethrough, a third member, a lowermost portion of said third member being connected near its lowermost portion to a rear side of the vertical extension member on an uppermost portion of the vertical extension member, said third member including a threaded hole having a circumferentially threaded screw member adjustably threaded therewithin so as to abut an adjacent portion of the tie down to effect a separation of a topmost part of the third member from the uppermost portion of the vertical extension member.

13. The tie down set forth in claim 12 further including at least one stub member that is integral with the third member and which projects slightly rearwardly from the third member to form a free stub edge at the top of the stub member that is situated generally below the threaded hole of the third member.

* * * * *